(12) United States Patent
Krahnert et al.

(10) Patent No.: US 10,189,190 B2
(45) Date of Patent: Jan. 29, 2019

(54) METHOD FOR PRODUCING A STRUCTURAL COMPONENT, PARTICULARLY FOR A VEHICLE BODY

(71) Applicant: ThyssenKrupp Steel Europe AG, Duisburg (DE)

(72) Inventors: Torsten Krahnert, Seddin (DE); Lothar Patberg, Moers (DE); Stefan Mayer, Schwerte (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 575 days.

(21) Appl. No.: 14/647,292

(22) PCT Filed: Nov. 22, 2013

(86) PCT No.: PCT/EP2013/074477
§ 371 (c)(1),
(2) Date: May 26, 2015

(87) PCT Pub. No.: WO2014/082929
PCT Pub. Date: Jun. 5, 2014

(65) Prior Publication Data
US 2015/0298368 A1    Oct. 22, 2015

(30) Foreign Application Priority Data

Nov. 27, 2012  (DE) .................. 10 2012 111 488

(51) Int. Cl.
*B29C 43/22* (2006.01)
*B29C 43/30* (2006.01)
(Continued)

(52) U.S. Cl.
CPC .......... *B29C 43/222* (2013.01); *B29C 43/021* (2013.01); *B29C 43/146* (2013.01);
(Continued)

(58) Field of Classification Search
CPC ... B29C 43/222; B29C 43/224; B29C 43/305; B29C 43/28; B29C 43/30; B29C 43/48;
(Continued)

(56) References Cited

U.S. PATENT DOCUMENTS 8,383,242 B2    2/2013  Malek et al.
2003/0168555 A1  9/2003  Livi et al.

FOREIGN PATENT DOCUMENTS

DE    102008058225 A1    7/2010
DE    102009023653 A1    12/2010
(Continued)

*Primary Examiner* — Robert J Grun
(74) *Attorney, Agent, or Firm* — The Webb Law Firm (57) ABSTRACT

A method for producing a structural component for a vehicle body, the method includes forming a flat carrier material made of a metal, a thermoplastic material and/or a fiber-reinforced thermoplastic material to give a three-dimensional component, and providing a supporting material made of a thermoplastic material, such that the carrier material and the supporting material form an integral material composite. The material composite made up of the carrier material and the supporting material is produced before the carrier material is formed. The material composite is heated before the forming in order to make forming of the thermoplastic material possible. A rib structure is impressed into the supporting material during the forming of the material composite, and the temperature of the three-dimensional component having the rib structure is controlled, it preferably being cooled.

15 Claims, 6 Drawing Sheets

(51) Int. Cl.
  *B29C 43/28*   (2006.01)
  *B29C 43/02*   (2006.01)
  *B29C 43/14*   (2006.01)
  *B29C 43/48*   (2006.01)
  *B32B 37/08*   (2006.01)
  *B32B 37/10*   (2006.01)
  B29C 69/00    (2006.01)
  B32B 37/06    (2006.01)
  B32B 37/20    (2006.01)
  B29C 43/18    (2006.01)
  B29K 101/12   (2006.01)
  B29L 31/30    (2006.01)

(52) U.S. Cl.
  CPC .......... *B29C 43/224* (2013.01); *B29C 43/28* (2013.01); *B29C 43/30* (2013.01); *B29C 43/305* (2013.01); *B29C 43/48* (2013.01); *B32B 37/08* (2013.01); *B32B 37/1027* (2013.01); *B29C 43/18* (2013.01); *B29C 69/00* (2013.01); *B29C 2043/483* (2013.01); *B29K 2101/12* (2013.01); *B29L 2031/3002* (2013.01); *B32B 37/06* (2013.01); *B32B 37/203* (2013.01); *B32B 2311/00* (2013.01); *B32B 2398/20* (2013.01); *B32B 2605/08* (2013.01)

(58) Field of Classification Search
  CPC ..... B29C 43/146; B29C 43/021; B29C 43/18; B29C 2043/483; B29C 69/00; B29L 2031/3002; B29K 2101/12; B32B 37/1027; B32B 37/08; B32B 37/203; B32B 2311/00; B32B 2398/20; B32B 2605/08; B32B 37/06
  See application file for complete search history.

(56) References Cited

FOREIGN PATENT DOCUMENTS

| | | |
|---|---|---|
| DE | 202009023653 A1 | 12/2010 |
| DE | 102009042272 A1 | 3/2011 |
| DE | 102010054195 A1 | 6/2012 |
| DE | 102011100396 A1 | 11/2012 |
| EP | 1336469 A1 | 8/2003 |
| FR | 2749535 A1 | 12/1997 |
| JP | 49101674 | 9/1974 |
| JP | 55133762 A | 10/1980 |
| JP | 56144956 S | 11/1981 |
| JP | 58181250 U | 12/1983 |
| JP | 4259515 A | 9/1992 |
| JP | 5309678 A | 11/1993 |
| JP | 639861 A | 2/1994 |
| JP | 827281 A | 1/1996 |
| JP | 201116275 A | 1/2011 |
| JP | 2012206503 A | 10/2012 |
| JP | 2012214003 A | 11/2012 |
| WO | 2006037852 A1 | 4/2006 |
| WO | 2006096894 A1 | 9/2006 |

METHOD FOR PRODUCING A STRUCTURAL COMPONENT, PARTICULARLY FOR A VEHICLE BODY

CROSS-REFERENCE TO RELATED APPLICATIONS

This application is the United States national phase of International Application No. PCT/EP2013/074477 filed Nov. 22, 2013, and claims priority to German Patent Application No. 10 2012 111 488.9 filed Nov. 27, 2012, the disclosures of which are hereby incorporated in their entirety by reference.

BACKGROUND OF THE INVENTION

Field of the Invention

The invention relates to a method for producing a structural component, in particular a structural component for a vehicle body, in which method a flat carrier material made of metal, thermoplastic material and/or fiber-reinforced thermoplastic material is formed to give a three-dimensional component, and in which method the carrier material is provided with supporting material made of thermoplastic material, such that the carrier material and the supporting material form an integral material composite.

Description of Related Art

In the present context, the term structural component encompasses in particular lightweight components and supporting components for vehicles.

DE 10 2008 058 225 A1 discloses a method for producing a lightweight component in hybrid form, in which method a main body made of galvanized iron which is in the form of a shaped part and, for example, has a U-profile shape and has been produced by forming a steel sheet is provided with thermoplastic material by in-mold lamination in such a manner that the main body of the finished lightweight component has rib-shaped reinforcing structures consisting of the molded-on thermoplastic.

DE 10 2009 042 272 A1 discloses a lightweight component, in particular a vehicle body part, made of metal sheet with a reinforcing structure made of plastic which has ribs, the metal sheet being integrally connected to a reinforcing layer made of plastic, which in turn is integrally connected to the reinforcing structure made of plastic. To produce this lightweight component, DE 10 2009 042 272 A1 proposes a plurality of methods, in each of which the metal sheet is formed and then inserted into a mold half. The reinforcing layer is produced from a flat pre product having a thermoplastic matrix with reinforcing fibers. Here, the flat pre product is heated and then applied to the formed metal sheet. To produce the reinforcing structure (ribs), in one variant of the method fiber-reinforced thermoplastic is extruded and arranged on the heated, flat pre product. Then, a mold half is placed on, and the two mold halves are pressed against one another. In another variant of the method, firstly the flat pre product is connected to the formed metal sheet by placing a mold half onto the heated pre product, which has been arranged on the formed metal sheet inserted into the mold half, and pressing the two mold halves against one another. The metal sheet thereby reinforced with the flat pre product is then removed from the press and inserted into an injection-molding tool. To produce the reinforcing ribs, the extruded fiber-reinforced thermoplastic is then sprayed onto the metal sheet reinforced with the flat pre product in the injection-molding tool.

These known methods for producing lightweight components in hybrid form require a relatively large number of production steps or the combination of a plurality of processes.

SUMMARY OF THE INVENTION

Proceeding from this, the present invention was based on the object of specifying a method of the type mentioned in the introduction which requires relatively few production steps and affords a relatively high productivity.

The method according to the invention is characterized in that the material composite made up of the carrier material and the supporting material is produced before the carrier material is formed to give the three-dimensional component, in that the material composite is heated before the forming in order to make forming of the thermoplastic material possible, in that a rib structure is impressed into the supporting material during the forming of the material composite, and in that the temperature of the three-dimensional component having the rib structure is controlled, it preferably being cooled.

The method according to the invention is based on the concept of providing a completely consolidated semifinished product which is further processed in a thermal forming process to give a finished structural component with the desired final geometry. The thermal forming process in this respect can include conventional operational stages such as perforating, cutting and/or adjusting. Accordingly, a preferred configuration of the method according to the invention provides that the component having the rib structure is cut, perforated and/or set to end contour.

Since the forming of the rib structure into the supporting material is carried out chronologically in parallel with the forming of the flat carrier material, the number of production steps in the method according to the invention is reduced considerably. In particular, this allows for or achieves an increased productivity.

In the method according to the invention, metal sheet, thermoplastic slab or flat material and/or fiber-reinforced, thermoplastic plate or flat material (what is termed organosheet) is used as the flat carrier material. The carrier material in this case can be embodied with one or more layers, in particular with two layers or as sandwich material. The layers of the multi-layer carrier material preferably consist of different materials, for example of metal and thermoplastic material with or without fiber reinforcement. Moreover, the method according to the invention encompasses embodiments in which the flat carrier material is processed as strip material or as a blank, for example in the form of a plate.

The carrier material has the function in particular of defining the geometry (shape) of the finished structural component. Thus, by way of example, metal sheet as carrier material can define the outer skin of the structural component produced according to the invention. Moreover, the single-layer or multi-layer carrier material provides the structural component produced according to the invention with a certain degree of rigidity and strength, but this alone is generally not sufficient for the intended use of the structural component. In addition to the formed carrier material, the supporting material with the rib structure formed therein serves for ensuring a sufficient rigidity and strength of the structural component.

In order that the structural component produced according to the invention has a high energy absorption capacity (impact energy absorption capacity), fiber-reinforced thermoplastic material (organosheet) is preferably used for the carrier material thereof, it being possible for the carrier material to be embodied in single-layer form or else in multi-layer form, in particular as a sandwich-like material composite, and one of the layers of the multi-layer material composite preferably consisting of metal, particularly preferably of steel, for example galvanized steel sheet.

If fiber-reinforced thermoplastic material is used as carrier material or alongside metal as additional carrier material in the method according to the invention, the carrier material contains long fibers, short fibers and/or continuous fibers made of inorganic and/or organic material. In this context, short fibers are understood to mean fibers having a length in the range of 0.1 to 1 mm, long fibers are understood to mean fibers having a length in the range of 1 mm to 50 mm, and continuous fibers are understood to mean fibers having a fiber length of greater than 50 mm.

The inorganic fibers (reinforcing fibers) are preferably glass, ceramic and/or basalt fibers. The organic fibers (reinforcing fibers) by contrast consist, for example, of aramid, nylon and/or carbon fibers.

The thermoplastic material of the carrier material or of the supporting material is preferably polyamide (PA), polypropylene (PP), polycarbonate (PC), polyethersulfone (PES), acrylonitrile butadiene styrene (ABS), styrene-acrylonitrile copolymer (SAN), polyoxymethylene (POM), polytetrafluoroethylene (PTFE), thermoplastic polyurethane (TPU), polyethylene (PE), polybutylene terephthalate (PBT) and/or mixtures thereof. The thermoplastic material used in the method according to the invention preferably has a temperature resistance of at least 80° C., particularly preferably at least 100° C.

The thermoplastic supporting material is applied to the flat, single-layer or multi-layer carrier material with a layer thickness which is dimensioned depending on the application in accordance with the rib thickness and/or rib size to be produced, this preferably being at least twice, particularly preferably at least three times, the thickness of the flat, single-layer or multi-layer carrier material.

The supporting material can be applied to the carrier material in a plurality of layers. A further configuration of the method according to the invention is characterized in that the layers of the supporting material are applied to the carrier material with a different material composition, different area size and/or different layer thickness. It is thereby possible to produce structural parts having an optimized impact energy absorption capacity or optimized rigidity combined with a relatively low component weight from the material composite (semifinished product) produced according to the invention.

A further advantageous configuration of the method according to the invention is characterized in that the supporting material is applied to defined subarea regions of the carrier material. This configuration, too, is advantageous for optimizing the rigidity and/or the impact energy absorption capacity of the structural component with a relatively low or minimized component weight. For this purpose, a further configuration of the method provides that the supporting material is applied to various subarea regions of the carrier material with a different material composition and/or different layer thickness.

For optimizing the rigidity and/or the impact energy absorption capacity of the structural component, it is possible according to a further advantageous configuration of the method according to the invention for the supporting material to be applied to the carrier material in the form of an individual strip or in the form of a plurality of strips, to be precise in such a way that the respective strip covers a specific subarea region of the carrier material.

A further advantageous configuration of the method according to the invention consists in the fact that the material composite made up of the flat carrier material and the supporting material is formed and the temperature of the component is controlled by means of a temperature-controlled forming tool. The forming tool may be a "cold", conventional tool, but it may also be the case that the temperature thereof can be controlled, i.e. it can be actively cooled and/or heated, depending on requirements. It is thereby possible for the productivity of the method to be increased further.

A particularly high productivity can be achieved in particular when, according to a further configuration of the method according to the invention, the material composite made up of the carrier material and the supporting material is produced in a continuous belt running process, strip-shaped carrier material and strip-shaped supporting material being integrally connected to one another. This configuration is suitable in particular for the production of elongate, profiled structural components, for example side impact bars, front and rear bumpers, sills and/or vehicle roof pillars.

The material composite, which is produced in a continuous belt running process, can be wound up to form a coil or can be cut to length to form plates, it being possible for the respective coil or the plates to then be processed further to give the desired structural component.

Another configuration of the method according to the invention provides that the material composite made up of the carrier material and the supporting material is produced in a discontinuous laminating and/or material application process, supporting material being applied at least partially to prefabricated carrier material plates in such a manner that an integral connection is generated between the respective carrier material plate and the supporting material applied thereto. This configuration is advantageous particularly when the supporting material is to be applied to one or more defined subarea regions of the carrier material. It is thereby possible for tailored supporting material area portions (blanks) to be applied to one or more defined subarea regions of the carrier material. In this case, the tailored supporting material area portions can differ in their shape (geometry), layer thickness and/or material quality.

The structure of the material composite (semifinished product) produced from the flat carrier material and the thermoplastic supporting material can be configured differently in the method according to the invention. In one configuration of the method, it is provided that the supporting material is applied to the carrier material in the form of a homogeneous, flat layer. This configuration can be implemented relatively easily in terms of process engineering by means of a continuous belt running process, but when prefabricated plates or blanks are used in a patching and laminating process. Here, "patching" or patching process is understood to mean the application of tailored supporting material patches.

According to a further configuration of the method, it is provided that the supporting material used is fiber-reinforced thermoplastic material. A structural component, in particular a vehicle body part, having a relatively low weight and a high rigidity and strength can be produced from the thus obtained material composite (consolidated semifinished product) by thermal forming. Through the use of fiber-reinforced thermoplastic material as supporting material, it is possible to achieve structural components, in particular lightweight components, having a high impact energy absorption capacity.

The rib structure of the structural component produced according to the invention, which increases the rigidity and strength, is configured in keeping with requirements, for example it is embodied as a honeycomb-shaped, rectangular or rhombic structure. The structure/shape is configured depending on the application, such that or where irregular structures can also be chosen. A correspondingly embodied rib structure provides the structural component with a high rigidity and strength combined with a low component weight.

A further advantageous configuration of the method according to the invention is characterized in that the rib structure is impressed at least partially in the form of an auxetic rib structure. An auxetic structure has transverse deformation properties, which behave contrary to those of conventional materials, in particular a conventional honeycomb structure. This is because, whereas in the case of conventional materials or rib structures positive tensile loading leads to elongation in the tensile direction and at the same time to instances of shortening in the directions perpendicular thereto, in the case of an auxetic structure unidirectional tensile stresses generate positive changes in length in all three spatial directions. Properties such as rigidity, impact energy absorption capacity, compliance and fracture strength in particular can be influenced very advantageously by the integration of an auxetic rib structure. An auxetic rib structure makes it possible in particular to significantly increase the thermal dent-stability.

BRIEF DESCRIPTION OF THE DRAWINGS

Hereinbelow, the invention will be explained in more detail with reference to a drawing which illustrates a plurality of exemplary embodiments. In the drawing, schematically.

DESCRIPTION OF THE INVENTION

Figure 1:
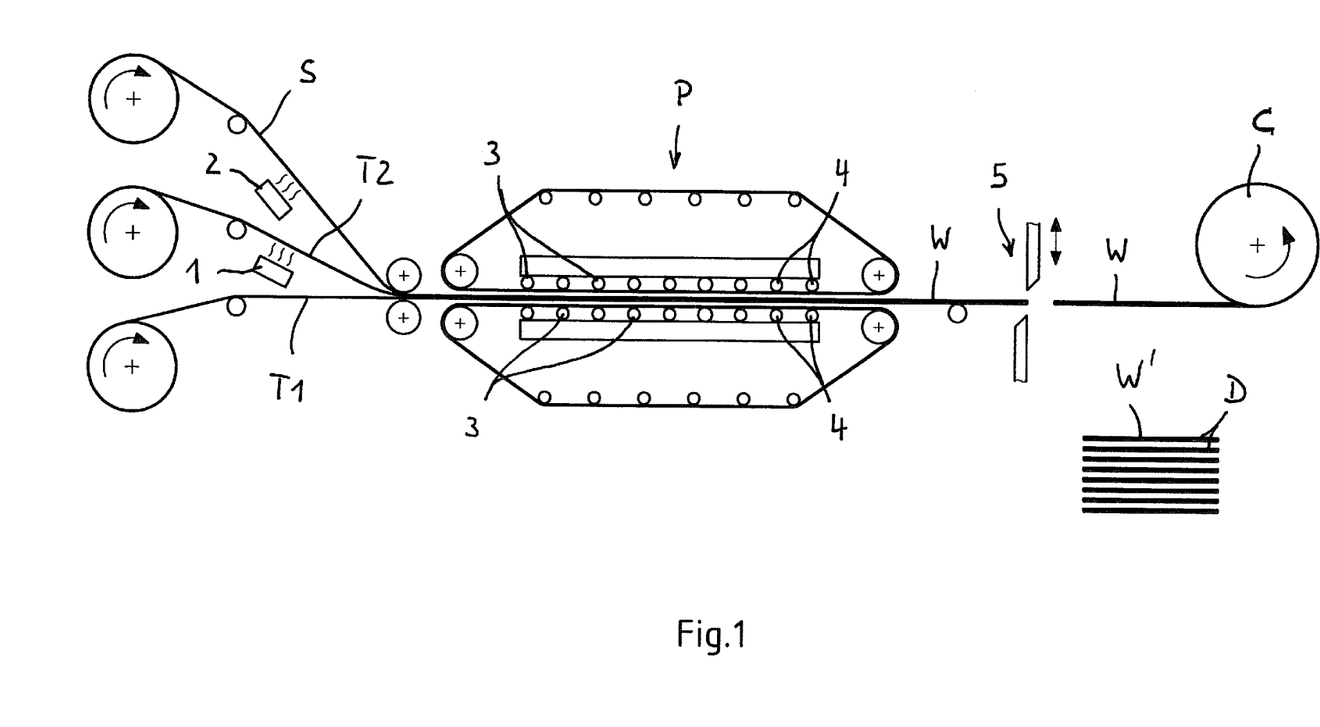
FIG. 1 shows a plant for producing a semifinished product which is made up of flat carrier material and thermoplastic supporting material.

FIG. 1 schematically illustrates a plant for producing a material composite according to the invention as a consolidated semifinished product to be further processed to give a structural component, in particular a vehicle body part. In this plant, a material composite (semifinished product) W or W' which is made up of a single-layer or multi-layer flat carrier material and a single-layer or multi-layer thermoplastic supporting material is produced in a continuous belt running process. For this purpose, strip-shaped, plastically formable carrier material T1, preferably metal sheet, for example galvanized steel sheet, which is present as a coil, is unwound from the coil and fed to a belt press P. If appropriate, a second carrier material layer T2 made of fiber-reinforced thermoplastic material can be applied to the flat carrier material T1. In addition to said combination of the carrier materials T1, T2, these can also be used individually as carrier materials T1 or T2. This second carrier material layer T2 can likewise be present as a coil. 1 denotes a heating apparatus, e.g. a radiant heater, by means of which that side of the second carrier material layer T2 which is to be integrally connected to the carrier material layer T1 is plasticized or formed into a gel. It is also within the context of the present invention, however, to extrude the second carrier material layer T2 directly onto the first carrier material layer T1, which preferably consists of metal sheet.

Moreover, a thermoplastic supporting material S is applied to the single-layer or multi-layer carrier material strip T1, T2, this preferably being a metal strip or a metal-plastic composite strip. In the exemplary embodiment shown, the thermoplastic supporting material S is likewise present as a coiled strip (coil). 2 in turn denotes a heating apparatus, by means of which that side of the supporting material strip S which is to be integrally connected to the carrier material strip T1, T2 is plasticized or formed into a gel.

The strips T1, T2, S are guided together by means of deflection or guide rolls and passed into the belt press P, where they are pressed together to form a strip-shaped material composite W. For this purpose, the belt press P has heated rolls 3 and a cooling device which follows these rolls 3 in the conveying direction. By way of example, the cooling device comprises cooled pressure rolls 4, which are arranged in the belt press. The thickness of the thermoplastic supporting material strip S or of the supporting material S applied to the carrier material T1, T2 is dimensioned suitably for the application, and is for example a multiple of the thickness of the single-layer or multi-layer carrier material strip T1, T2. By way of example, the thickness of the carrier material strip T1 and/or T2 lies in the range of 0.5 to 1.5 mm, while the thickness of the strip S made of thermoplastic supporting material lies in the range of 4 to 8 mm.

The strip-shaped material composite W produced in the continuous belt running process is wound up to form a coil C or cut into blanks D of a specific length by means of a cutting device 5. The coil C or the blanks D are therefore available as a consolidated semifinished product W, W', in order to then be processed to give a three-dimensional structural component having a rib structure, for example a vehicle body part. The further processing of the consolidated semifinished product W, W', i.e. the production of the structural component, will be explained hereinbelow on the basis of exemplary embodiments shown in FIGS. 8 and 9.

Figure 2:
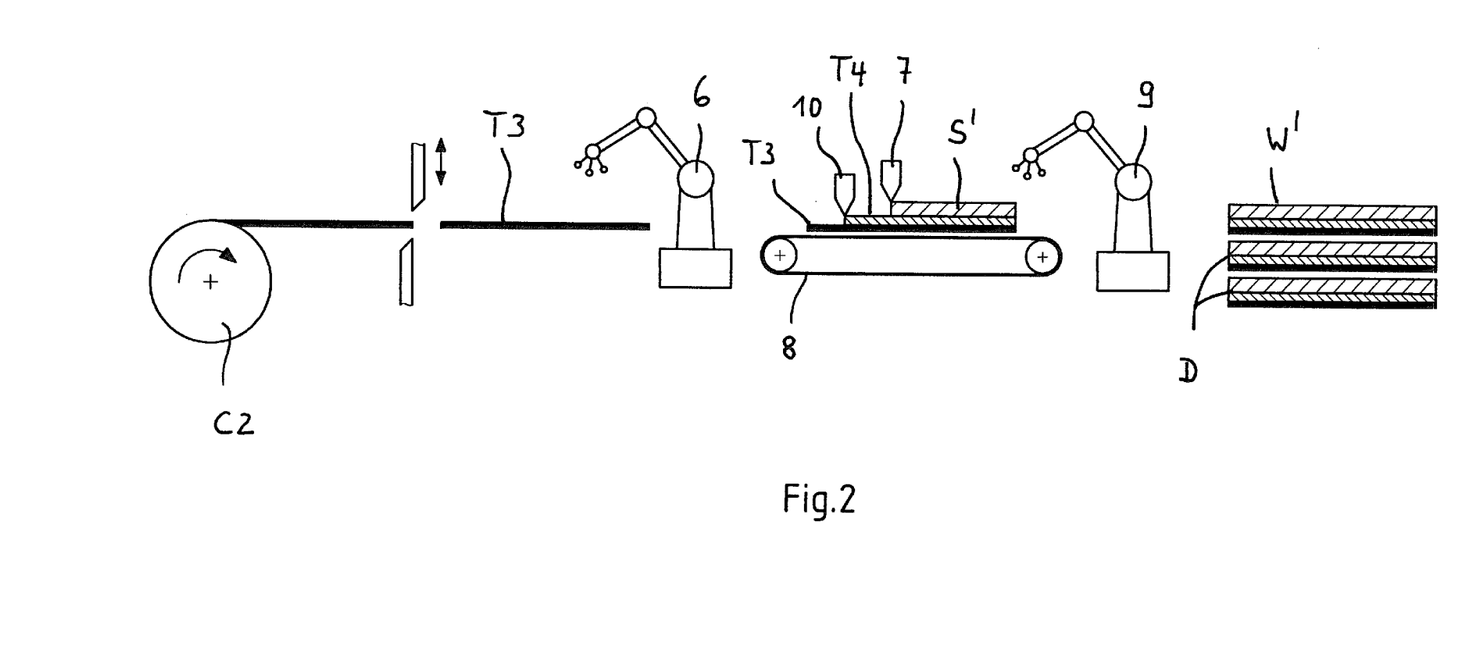
FIG. 2 shows a further plant for producing a semifinished product which is made up of flat carrier material and thermoplastic supporting material.

FIG. 2 shows a further example of a plant for producing a material composite according to the invention as a consolidated semifinished product W' to be further processed to give a structural component, in particular a vehicle body part. In the plant outlined in FIG. 2, prefabricated plates or blanks T3 made of metal and/or fiber-reinforced thermoplastic material (organosheet) are coated with thermoplastic supporting material S' in a discontinuous patching and laminating process. The thus produced material composite is accordingly made up of a single-layer or multi-layer flat carrier material T3 made of metal and/or fiber-reinforced thermoplastic material and a single-layer or multi-layer thermoplastic supporting material S'.

The plates or blanks T3 are produced, for example, by unwinding and cutting to length a corresponding coil C2, and are then conveyed by means of a transfer apparatus 6, preferably a robot, to a processing station, in which thermoplastic supporting material S' is applied to the respective plate or blank T3. In this process, the supporting material S' can be applied in single-layer or multi-layer form. In the exemplary embodiment shown, the supporting material S' is applied by means of at least one extrusion apparatus. For this purpose, the extrusion apparatus preferably has at least one application head (extruder outlet) 7 which is movable in relation to the plate/blank. By way of example, the processing station can have a conveyor belt 8 for receiving the plate/blank T3, the application head 7 being movable in the conveying direction and back and/or transversely to the conveying direction. Alternatively, the at least one application head 7 can also be mounted on a carriage which is movable in a plurality of directions running transversely to one another, or on a robot arm. In addition, provision can be made of a corresponding extrusion apparatus with an application head 10 for applying a fiber-reinforced thermoplastic as the second carrier material layer (intermediate layer) T4.

Furthermore, it is within the context of the present invention to apply the supporting material S' to the flat carrier material T3, T4 in the form of one or more prefabricated area blanks (patches) in single-layer and/or multi-layer form, instead of the direct extrusion of the thermoplastic supporting material S' onto the carrier material T3 or T4, as shown in FIG. 2. For this purpose, the plant then has a processing station with a placement apparatus 9, for example a robot, by means of which blanks and/or patches S' optimized in terms of end contour and made of thermoplastic material with or without fibers integrated therein are placed onto one or more predefined regions of the flat carrier material T3 or T4 made of metal and/or fiber-reinforced thermoplastic material. The blanks and/or patches S' optimized in terms of end contour are in this case integrally connected at least partially to the flat carrier material T3 or T4 and if appropriate to one another, such that the plates, blanks T3, T4 or patches S' of the material composite produced which are placed one onto another are fixed in position in relation to one another. For this purpose, the plant, preferably the placement apparatus 9, has at least one heating or welding element, by means of which the thermoplastic blanks or patches S' are integrally connected at least partially to the carrier material T3 or T4 or to one another.

Moreover, the method according to the invention also encompasses embodiments in which the plates, blanks T3, T4 or patches S' placed one onto another are heated and are integrally connected to one another to give a flat material composite (consolidated semifinished product) W' by being pressed together in a discontinuously operating press.

The prefabricated material composite pieces or consolidated semifinished products W' thus produced, in particular as shown in FIG. 1 or FIG. 2, are stacked on pallets or collected in containers, such that a multiplicity of such material composite pieces W' are combined for transportation and/or storage purposes.

FIGS. 3 to 7b schematically show a plurality of exemplary embodiments of semifinished products produced according to the invention, in a cross-sectional view or in a plan view.

Figure 3:
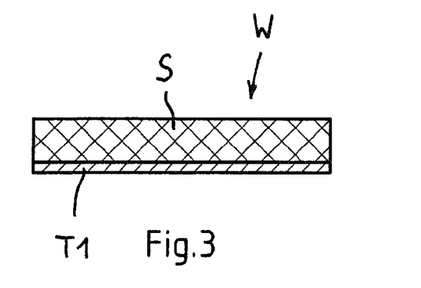
FIGS. 3 and 4 show semifinished products produced according to the invention, in each case in a cross-sectional view.

The semifinished product W as shown in FIG. 3 is made up of a flat carrier material T1 made of metal sheet, thermoplastic material or fiber-reinforced thermoplastic material and a homogeneous flat supporting material S made of thermoplastic material. That side of the carrier material T1 which faces toward the supporting material S is in this case covered completely by the supporting material S. The thickness of the supporting material S is dimensioned suitably for the application and is, for example, a multiple of the thickness of the carrier material T1. It is preferable that the flat supporting material S is at least three times thicker than the flat carrier material T1. However, it can also be thinner.

Figure 4:
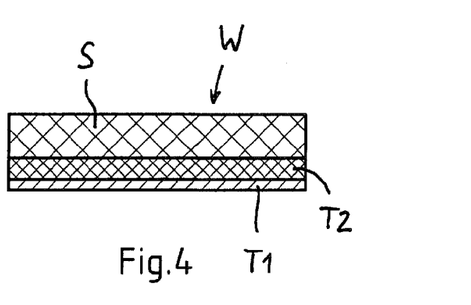

The semifinished product W shown in FIG. 4 is made up of a two-layer carrier material T1, T2 made of metal sheet (T1) and thermoplastic organosheet (T2) and a homogeneous flat supporting material S made of thermoplastic material. In this case, the organosheet T2 is arranged between the metal sheet T1 and the single-layer thermoplastic supporting material S. The three material layers T1, T2 and S of the semifinished product W are formed so as to be congruent in relation to one another. The thickness of the organosheet T2 corresponds at least to the thickness of the metal sheet T1; however, it is preferable that the organosheet T2 is dimensioned so as to be considerably thicker than the metal sheet T1. By way of example, the thickness of the organosheet T2 is at least 1.5 times the thickness of the metal sheet T1. The organosheet T2 provides a structural component B produced from the semifinished product (material composite) W as shown in FIG. 4 with a high impact energy absorption capacity. The organosheet T2 of substantially homogeneous form contains organic and/or inorganic long fibers, short fibers and/or continuous fibers as reinforcing fibers. The thickness of the thermoplastic supporting material S can in turn be a multiple of the thickness of the carrier material T1, T2. It is preferable that the flat supporting material S is at least twice the thickness of the flat two-layer carrier material T1, T2.

Figure 5:
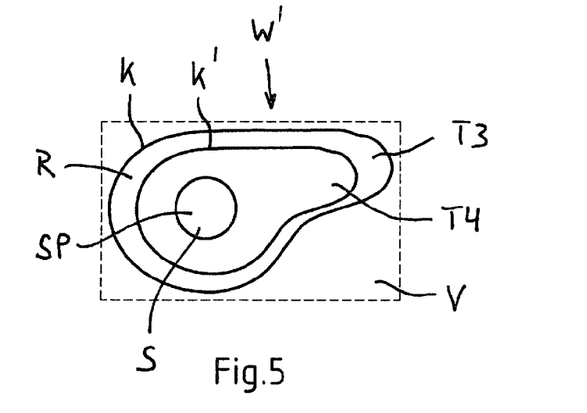
FIG. 5 shows a further semifinished product produced according to the invention, in a plan view.

The semifinished product W' shown schematically in FIG. 5 likewise has a three-layer form. It is made up of a metal sheet T3, a flat fiber-reinforced thermoplastic T4 and a homogeneous flat supporting material S made of thermoplastic material. The fiber-reinforced thermoplastic T4 contains long fibers, short fibers and/or continuous fibers as reinforcing fibers. In contrast to the exemplary embodiments shown in FIGS. 3 and 4, the fiber-reinforced thermoplastic T4 does not cover the metal sheet T3 over its entire area, but instead covers a defined subregion of the metal sheet T3. In this case, the subregion can have an asymmetrical shape with relatively wide and relatively narrow area portions. The thermoplastic supporting material S arranged on the fiber-reinforced thermoplastic T4 similarly covers a defined subregion of the fiber-reinforced thermoplastic T4.

Moreover, it is within the context of the present invention to form the semifinished product W' as shown in FIG. 5 in such a manner that the fiber-reinforced thermoplastic T4 has one or more cutouts (recesses), which are filled with thermoplastic supporting material S. In addition, the present invention also encompasses embodiments in which the thermoplastic supporting material S is applied to a metal sheet T3 without an intermediate layer T4, with one or more cutouts (recesses) being provided in the supporting material S and being filled with one or various fiber-reinforced thermoplastics T4.

Moreover, FIG. 5 outlines a configuration of the method according to the invention in which the semifinished product W' is adapted, by trimming the carrier material or metal sheet T3, to the contour of the structural component which is subsequently to be produced, and in which it is also the case that the patch T4, which is made of a fiber-reinforced thermoplastic and is applied to the metal sheet T3, and also the patch made of thermoplastic supporting material S which is applied thereto are adapted to the cutting contour K of the metal sheet T3 or to the end contour of the structural component to be produced. The contour of the fiber-reinforced thermoplastic T4 in this case runs, for example, at a distance from the contour (cutting edge) K of the metal sheet T3. That region of the metal sheet which is discarded as waste is denoted by V. After the metal sheet T3 has been trimmed, the fiber-reinforced thermoplastic T4 delimits an uncovered edge strip R, which in FIG. 5 has an encircling form, for example.

In the exemplary embodiment shown in FIG. 5, the patch made of thermoplastic supporting material S covers only a relatively small area of the fiber-reinforced thermoplastic T4 or metal sheet T3. It is therefore possible to refer to a local thermoplastic patch. Similarly, however, the patch SP made of thermoplastic supporting material S can also be formed, as desired, in such a way that the contour thereof runs substantially parallel to the contour K' of the fiber-reinforced thermoplastic T4 and/or parallel to the cutting edge K of the metal sheet T3.

Figure 6A:
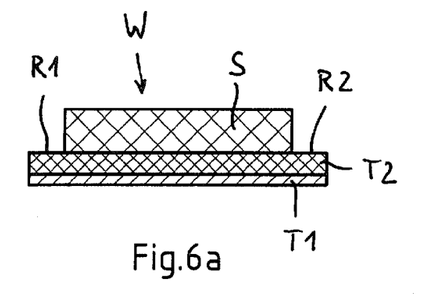
FIGS. 6a and 6b show a further semifinished product produced according to the invention, in a cross-sectional view and in a plan view.
Figure 6B:
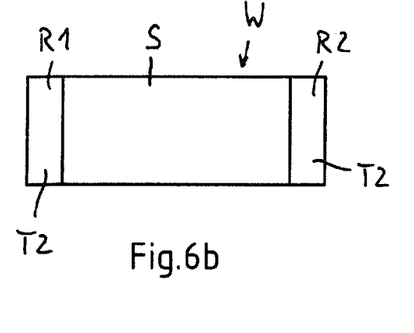

The semifinished product W shown in FIGS. 6a and 6b is made up of a two-layer carrier material made of metal sheet T1 and thermoplastic organosheet T2 and a homogeneous flat supporting material S made of thermoplastic material, the supporting material S being applied to the flat carrier material T1, T2 in the form of a continuous strip, which covers a subarea region of the carrier material. In the exemplary embodiment shown here, the supporting material S delimits two uncovered edge strips R1, R2 of the organosheet T2 or of the two-layer carrier material T1, T2.

Figure 7A:
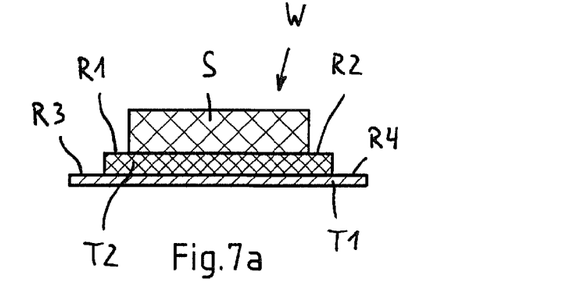
FIGS. 7a and 7b show yet a further semifinished product produced according to the invention, in a cross-sectional view and in a plan view.
Figure 7B:
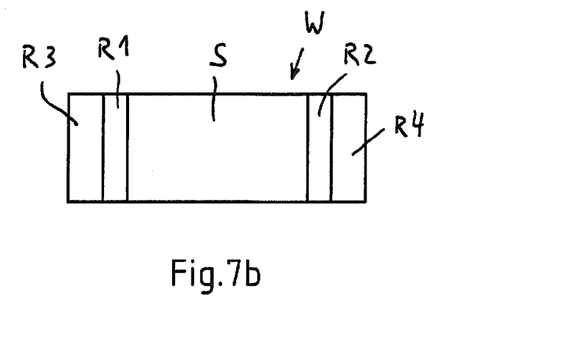

The semifinished product W shown in FIGS. 7a and 7b is likewise made up of metal sheet T1, thermoplastic organosheet T2 and a homogeneous flat supporting material S made of thermoplastic material. In this exemplary embodiment, the fiber-reinforced thermoplastic (organosheet) T2 is also applied to the metal sheet T1 in the form of a continuous strip. The organosheet T2 therefore delimits two uncovered edge strips R3, R4 of the metal sheet T1, while the supporting material S applied in strip form delimits two uncovered continuous edge strips R1, R2 of the organosheet T2.

The semifinished products W, W' shown in FIGS. 5 and 6a to 7b represent semifinished products which are optimized in terms of end contour or optimized in terms of end geometry in respect of the structural components to be produced therefrom.

The semifinished products W, W' produced according to the invention are processed further in a thermal forming process to give three-dimensionally shaped structural components B. During the forming process, a rib structure RS is simultaneously impressed into the thermoplastic supporting material S. For this purpose, before being fed into the forming tool, the semifinished product W, W' is heated, such that the thermoplastic supporting material S (and if appropriate the fiber-reinforced thermoplastic T2 or T3) can be plastically deformed and the rib structure RS can be produced.

Figure 8:
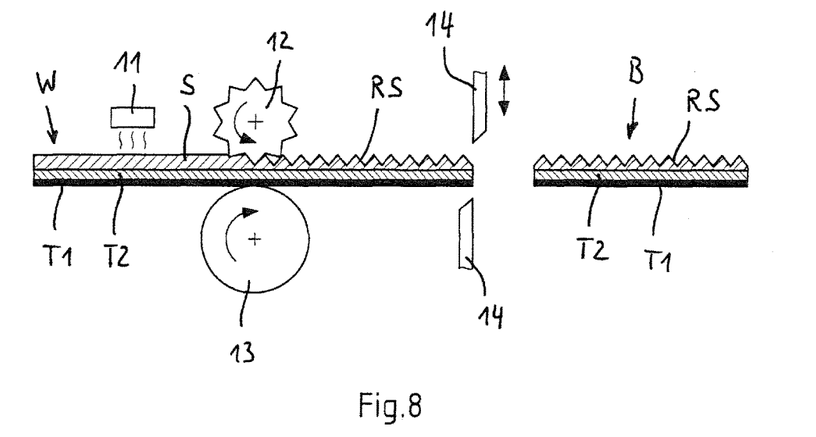
FIG. 8 shows a plant for thermally forming a semifinished product produced according to the invention.

FIG. 8 outlines a plant for thermally forming strip-shaped semifinished product W and simultaneously impressing a rib structure RS. By way of example, the strip-shaped semifinished product W may have been produced in a continuous belt running process as shown in FIG. 1 and wound up to form a coil C. The strip-shaped semifinished product W (which may have been unwound from the coil C) is heated by means of a heating device 11, for example a continuous furnace, to a temperature which is sufficient for the subsequent forming of the thermoplastic material S. The heated semifinished product W is then introduced into the forming tool. The forming apparatus, which is outlined merely schematically in FIG. 8, is configured as a continuously operating forming apparatus, by means of which the semifinished product W is formed by roll forming into an L, Z or U profile, for example, with a rib structure RS simultaneously being formed into the heated thermoplastic supporting material by means of at least one structured imprint roll (structuring roll) 12. The profile thus produced is cooled in the forming apparatus. For this purpose, one of the forming rolls 13 and/or imprint ros (structuring rollers) 12 may preferably be provided with one or more temperature-control ducts (not shown). As an alternative or in addition, the profile can be exposed, for example, to a cooling medium, preferably a gaseous cooling medium, downstream of the forming or imprint rolls 13, 12, as seen in the conveying direction. Furthermore, in the plant outlined in FIG. 8, the profile can also be cut, perforated, set to end contour and/or cut to length. The cutting and/or punching tools required for this are shown by way of example merely as cutting blades 14 in FIG. 8.

Figure 9:
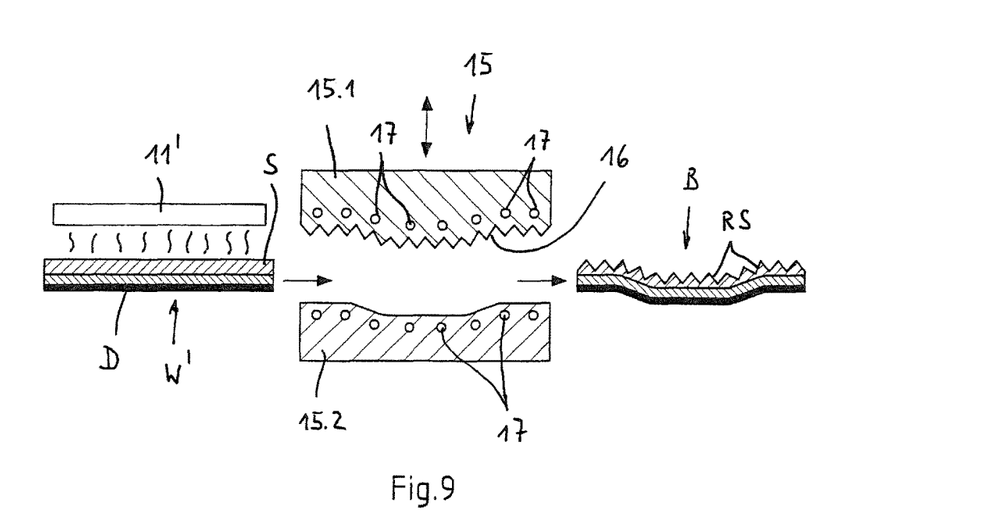
FIG. 9 shows a further plant for thermally forming a semifinished product produced according to the invention.

FIG. 9 shows a plant for thermally forming semifinished products W' which have been produced according to the invention and are prefabricated in the form of plates D. By way of example, the plates D may have been produced in a continuous belt running process as shown in FIG. 1 or a discontinuous patching and laminating process as shown in FIG. 2.

The plates D are firstly heated to a temperature which is sufficient for the subsequent forming of the thermoplastic material. This is carried out, for example, by means of a continuous furnace or a radiant heating device 11'. The heated plate D is then introduced into a forming press 15. The shaping surfaces of the forming tools 15.1, 15.2 are formed according to the contour of the structural component B to be produced. In addition, the forming tool 15.1 assigned to the thermoplastic supporting material S has the negative 16 of a rib structure RS to be formed into the supporting material S. The temperature of the heated structural component B produced in the forming press is controlled in the press 15, for example it is cooled. For this purpose, at least one of the forming tools 15.1, 15.2, preferably at least the forming tool 15.1 assigned to the thermoplastic supporting material S, has temperature-control ducts 17. Depending on the application, a conventional "cold" forming tool can also be used.

Figure 10:
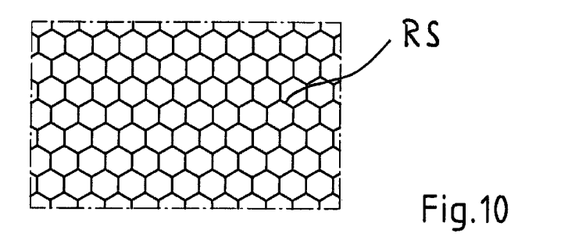
FIGS. 10 to 12 show various rib structures of structural components produced according to the invention, in each case in a plan view.
Figure 11:
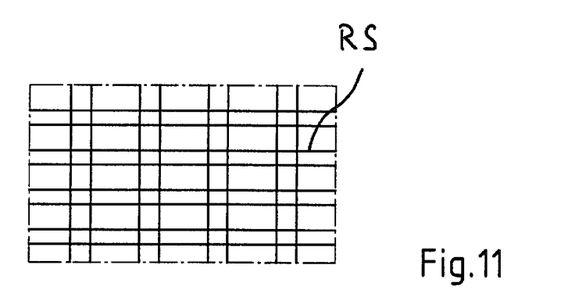
Figure 12:
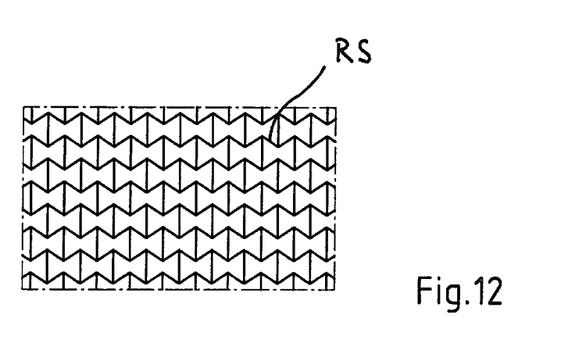

The rib structure RS which is formed into the thermoplastic supporting material S increases the rigidity and strength of the structural component B produced according to the invention. The rib structure RS is preferably formed into the thermoplastic supporting material S at least partially in the form of a honeycomb-shaped (FIG. 10), box-shaped (FIG. 11) and/or auxetic rib structure (FIG. 12). The box-shaped rib structure preferably has boxes of different sizes, in particular substantially rectangular boxes (cf. FIG. 11).

In principle, although it is not shown in the exemplary embodiments shown in the drawing, it is also within the context of the present invention to provide what is termed a "functional integration" in the component produced, i.e. that inlays, for example screws, nuts, inserts, etc., are positioned in the tool and then taken up by the supporting material ("encapsulated by injection molding") in the shaping process, such that a force fit and form fit results. In addition to said rib structures, it is also possible for screw-on domes made of the supporting material to be formed locally, for example.

Figure 13:
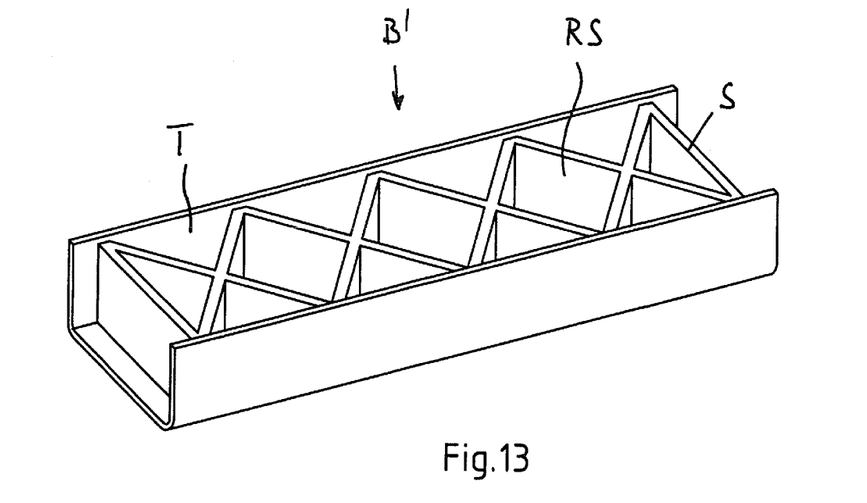
FIGS. 13 and 14 show two structural components produced according to the invention, in each case in a perspective illustration.
Figure 14:
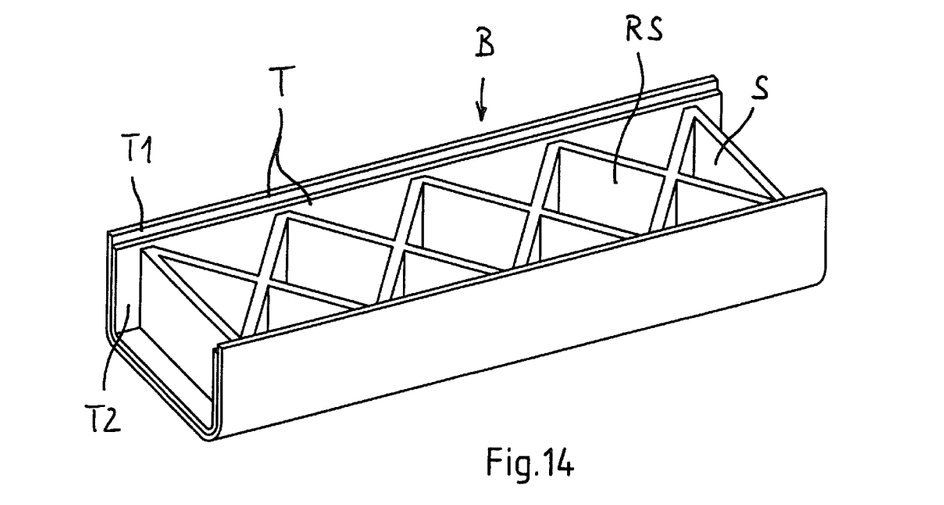

FIGS. 13 and 14 schematically show two structural components produced according to the invention. The structural component B' shown in FIG. 13 has a single-layer shell made of metal sheet or a fiber-reinforced thermoplastic as carrier material T and a rib structure RS made of thermoplastic supporting material S. By contrast, the structural component B shown in FIG. 14 has a two-layer shell made of metal sheet T1 and a fiber-reinforced thermoplastic T2 as carrier material T and likewise a rib structure RS made of thermoplastic supporting material S.

The method according to the invention can be used to produce structural components which are subjected to static and/or dynamic loading, in particular vehicle parts, for example side impact bars, bumpers, sills, reinforcing sheets, roof pillars and also outer skin parts of a vehicle, for example an outer skin of a door with a reinforcing structure on the inside and a hood with an integrated internal structure.

The invention claimed is:

1. A method for producing a structural component for a vehicle body, the method comprising:
   providing a flat carrier material made of a metal and one of a thermoplastic material or a fiber-reinforced thermoplastic material to give a three-dimensional component; and
   providing the carrier material with a supporting material made of a thermoplastic material, such that the carrier material and the supporting material form an integral material composite, wherein the carrier material is in the form of a multi-layer material composite, one of the layers of the multi-layer material composite consisting of metal, wherein the material composite made up of the carrier material and the supporting material is produced before the carrier material is processed to give the three-dimensional component, the layer thickness of the supporting material being at least twice the thickness of the multi-layer carrier material,
   after the material composite is formed, heating the material composite before the processing in order to make processing of the thermoplastic material possible, wherein a rib structure is impressed into the supporting material simultaneously during the three-dimensional forming of the material composite, and wherein the temperature of the three-dimensional component having the rib structure is controlled.

2. The method as claimed in claim 1, wherein the temperature of the component is controlled by cooling the component.

3. The method as claimed in claim 1, wherein the material composite is formed and the temperature of the component is controlled by a temperature-controlled forming tool.

4. The method as claimed in claim 1, wherein the component having the rib structure is cut, perforated and/or set to end contour.

5. The method as claimed in claim 1, wherein the material composite made up of the carrier material and the supporting material is produced in a continuous belt running process, and wherein a strip-shaped carrier material and a strip-shaped supporting material are integrally connected to one another.

6. The method as claimed in claim 1, wherein the material composite made up of the carrier material and the supporting material is produced in a discontinuous laminating and/or material application process, and wherein the supporting material is applied at least partially to prefabricated carrier material plates in such a manner that an integral connection is generated between the respective carrier material plate and the supporting material applied thereto.

7. The method as claimed in claim 1, wherein the supporting material is applied to the carrier material in the form of a homogeneous, flat layer.

8. The method as claimed in claim 1, wherein the supporting material used is a fiber-reinforced thermoplastic material.

9. The method as claimed in claim 1, wherein the supporting material is applied to one or more defined subarea regions of the carrier material.

10. The method as claimed in claim 9, wherein the supporting material is applied to various subarea regions of the carrier material with a different material composition and/or a different layer thickness.

11. The method as claimed in claim 1, wherein the supporting material is applied to the carrier material in the form of an individual strip or in the form of a plurality of strips, such that the respective strip covers a subarea region of the carrier material.

12. The method as claimed in claim 1, wherein the supporting material is applied to the carrier material in a plurality of layers.

13. The method as claimed in claim 12, wherein the layers of the supporting material are applied to the carrier material with a different material composition, different area size and/or a different layer thickness.

14. The method as claimed in claim 1, wherein the rib structure is impressed at least partially in the form of an auxetic rib structure.

15. The method as claimed in claim 1, wherein the rib structure is impressed at least partially in the form of a honeycomb-shaped rib structure.

* * * * *